March 24, 1925.
H. TUFF
1,531,052
HOG CATCHING AND HOLDING DEVICE
Filed Nov. 16, 1923    2 Sheets-Sheet 1

INVENTOR.
Henry Tuff,
BY
Geo. P. Kimmel. ATTORNEY.

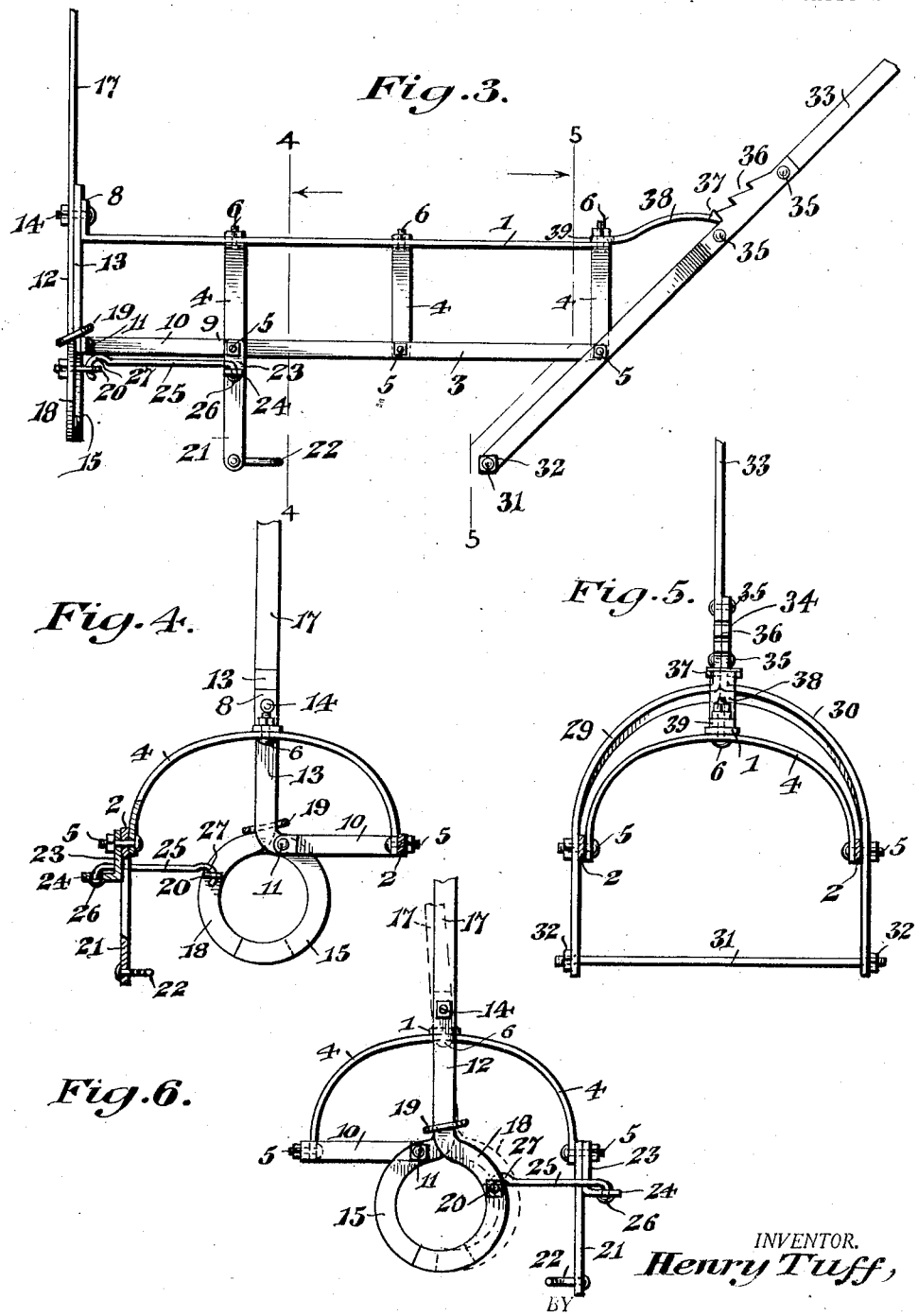

Patented Mar. 24, 1925.

1,531,052

UNITED STATES PATENT OFFICE.

HENRY TUFF, OF VALLEY SPRINGS, SOUTH DAKOTA.

HOG CATCHING AND HOLDING DEVICE.

Application filed November 16, 1923. Serial No. 675,179.

*To all whom it may concern:*

Be it known that I, HENRY TUFF, a citizen of the United States, residing at Valley Springs, in the county of Minnehaha and State of South Dakota, have invented certain new and useful Improvements in Hog Catching and Holding Devices, of which the following is a specification.

This invention relates to animal catching and holding devices, and in particular pertains to a device for catching and holding hogs.

The primary object of this invention resides in the provision in a manner as hereinafter set forth, of a hog catching and holding device, which when applied to a hog prevents him from running, biting, or in any way moving his body, thus allowing a person to handle or move the animal into any position desired.

A further object of this device is the provision in a manner as hereinafter set forth, of a hog catching and holding device which upon a single movement of a lever will engage and force both rear legs of hog upward against its body thus effectively incapacitating the animal by preventing the use of the rear legs.

A still further object of this invention is the provision in a manner as hereinafter set forth, of a device for catching and holding hogs, which in addition to its having means for effectively preventing the use of the legs of the animals, provides means for quickly and securely holding the snout of the animal to prevent the animal from biting.

The invention comprises a frame structure adapted to straddle the hog's back and having at its forward end a tong-like means adapted to surround and securely grasp the snout of the hog, and having at the rear end, a pivoted yoke-shaped element having a cross bar connecting the lower ends of the yoke, which element is adapted to be swung rearwardly to bring the cross bar forwardly beneath the rear legs of the hog, to force the animal's legs up against the under surface of its body, spring pressed means being carried by the frame to hold this leg holding element in place thus totally disabling the hog, as long as the device is in position.

A final object of this invention is the provision in a manner as hereinafter set forth, of a hog catching and holding device which will be light in weight but strong and sturdy, easily and quickly applied, not complicated in operation, and inexpensive to manufacture.

The invention will be best understood from a consideration of the following detailed description taken in connection with the accompanying drawings forming part of this specification, with the understanding that the invention is not confined to any strict conformity with the showing of the drawings, but may be changed and modified so long as such changes and modifications mark no material departure from the salient features of the invention as expressed in the appended claims.

In the drawings:—

Fig. 3 is a side elevation of the device, showing the opposite side from that shown in Fig. 1.

Fig. 4 is a sectional view, taken on the line 4—4 of Fig. 3.

Fig. 5 is a transverse sectional view, taken on the line 5—5 of Fig. 3.

Fig. 6 is a front elevation of the device.

Figure 1:
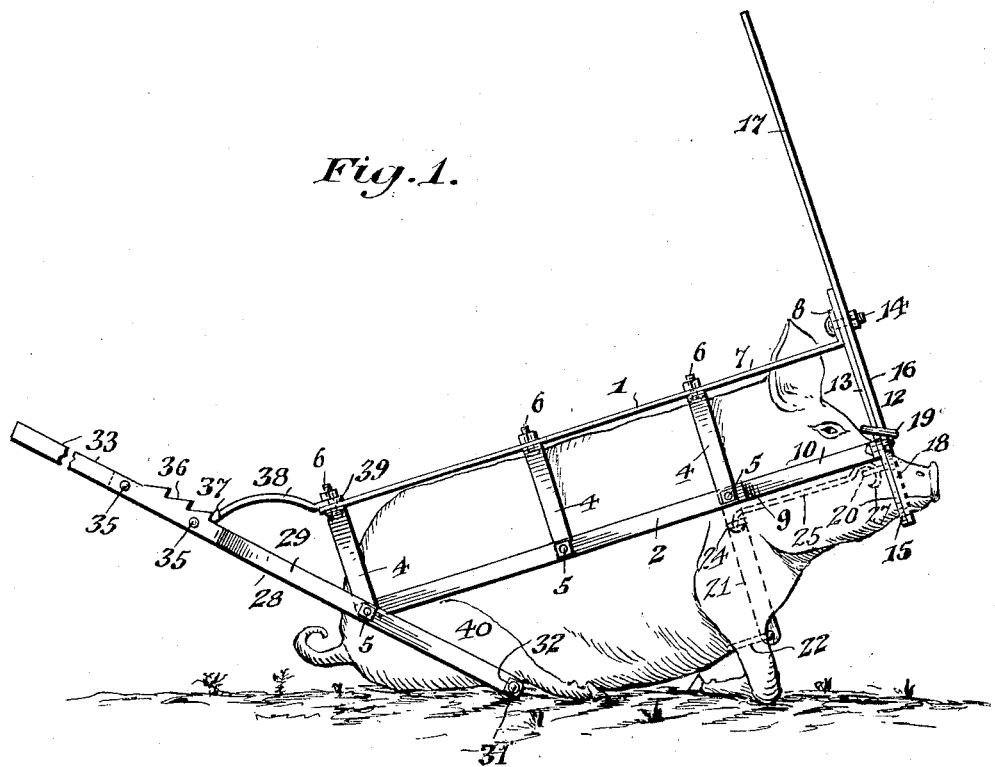
Figure 1 is a side elevation of the device embodying this invention, shown applied.
Figure 2:
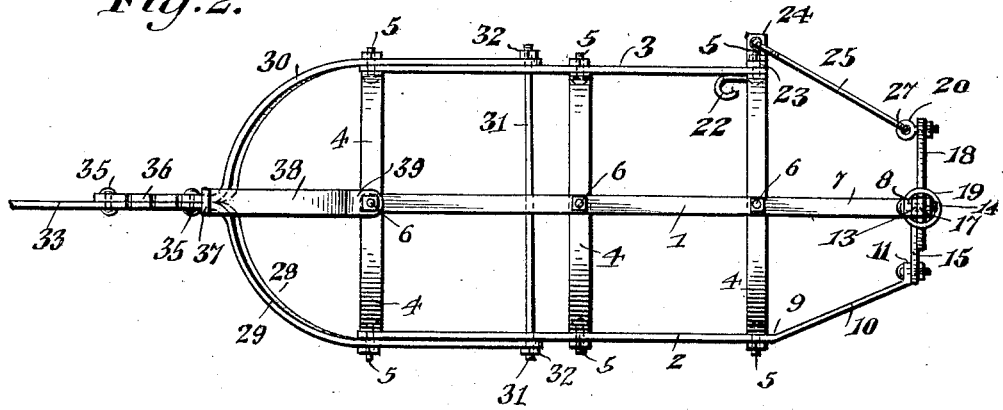
Fig. 2 is a top plan view of the device embodying this invention.

Referring now to the drawings in detail wherein like numerals of reference indicate corresponding parts throughout the several views of the drawing, the frame of this device comprises three parallel bar members 1, 2 and 3, the bar 1 being adapted to lie upon the back of the animal when the device is applied, and the bars 2 and 3 being disposed at a lower plane than the bar 1 and in the same plane with each other, and adapted to be positioned one on either side of the animal and extend lengthwise thereof, as clearly shown in Fig. 3 of the drawings. The three bar members are held together by a series of yoke members 4, these yoke members being substantially semi-circular in contour and engaging at the ends of their legs, the bars 2 and 3, to which they are attached by bolt members 5, the bar 1 extending across and being connected to the central top portion of each of the yokes by nut and bolt members 6. This structure thus far described, forms a saddle-shaped device which is adapted to saddle across the back of the animal.

As clearly shown in Fig. 1, the bar 1 and the bar 2 are extended a substantial distance beyond the forward yoke 4, the bar 1 being extended forward to provide the arm 7, having its end upturned to form the bracket 8, while the bar 2 has its forward end bent inwardly as at 9 where the member passes over the forward yoke 4 to provide the inwardly extending brace arm 10, which brace arm further has its free end bent inwardly at an angle to provide the horizontal bracket 11. These brackets 8 and 11 are so arranged that their outer faces are in the same plane, so that they can be attached to, to support one portion of, a snout engaging member 12. This snout engaging member is found in two parts, one of the parts comprising a short vertical arm 13 secured at its upper end by a bolt 14 to the bracket 8, and having its lower end formed to provide a semicircular hook 15, the concaved portion of which hook faces the center of the device, the bracket 11 abutting and being connected to the inner surface of the hook member adjacent the point where it connects with the vertical member 13. The second portion of this snout engaging member 12 comprises a movable member 16 of the same contour as the member 13, with the exception that this member 16 has its vertical portion extending upwardly a greater distance than the vertical portion of the member 13 to provide an actuating handle 17 for the device, and further the semicircular hooked end 18 of this pivoted portion has its concaved portion in opposed relation to the concaved portion of the hook 16 of the other member. As clearly shown in Fig. 6, this pivoted portion is supported only at one point by the frame, namely upon the bolt 14 which transverses the bracket 8 and the vertical portion 14 of the stationary member. Surrounding the vertical portion of the two members is a ring 19 which when the parts 15 and 18 are brought together drops to the position shown in Fig. 6, thus locking the two parts together. The part 18 is also provided at its inner side with an eye 20, the use of which will become apparent as the description of the device proceeds.

Depending from the forward end of the bar 3, which bar, as will be seen, does not extend forward as do the bars 1 and 2, but terminates at the end of the legs of the yoke 4, is a bar 21 having secured at the lower end, upon its inner side, a forwardly facing hook member 22, which hook member is adapted to engage the adjacent front leg of the animal when the device is in applied position. An angle bracket 23 is also positioned upon this side of the device and has one of its arms in vertical position with the back thereof resting upon the outer surface of the depending bar 21 and held in position by the bolt 5 which passes through the lower leg of the yoke member 4, the upper end of the bar 21 and the upper end of this vertical arm of the angle member. The other leg of the member 23 extends outwardly from the face of the bar 21 and has therethrough an aperture for the passage of the hook bar 25 which has its outer end bent at right angles where it passes through the extension 24, the end of the angle portion of the hook member being headed as at 26 to prevent the angle from passing through the aperture. The other end of the member 25 is provided with the hook 27, which engages the eye 20 when the snout clamping member is closed thus assisting the ring 19 in holding the pivoted portion of the member in position.

Connected to the rear portion of the frame of the device is a pivoted yoke member 28 formed in two sections 29 and 30, this yoke member being pivoted to the frame by means of the bolts 5 which holds the stationary yoke 4 and parallel bars together. As clearly shown, this yoke member has its legs pivoted to the frame a substantial distance inwardly from the ends of the legs, and the legs at their ends are connected beneath the body of the frame by a bar 31 having each end screw threaded and provided with nuts 32 which bear against the outer surface of the legs of the yoke member to secure the bar rigidly in position. One of the two sections 29 of the yoke member has its free end extended rearwardly along the line of the longitudinal axis of the frame, a substantial distance to provide the actuating lever 33, while the other of the two members 30 has its free end extended along the same line a shorter distance, as indicated at 34, bringing the extensions together as shown so that they may be secured by means of rivets or bolts 35. Across the upper surface of these two secured members is formed a series of outstanding teeth 36 adapted to be engaged by the head 37 of a spring tongue 38, the inner end of which tongue is secured at the point 39 upon the rear end of the bar 1 over the center of the rear yoke 4. This tongue 38 is formed of spring material and so bent that it normally forces the head 37 downward against the extension of the yoke 28 so that when the lever 33 of the yoke is pressed downwardly, the teeth 36 are drawn away from the head 37 allowing the head to fall behind the face of the teeth thus causing the engagement of the head with the teeth when the lever 33 is released. It is, of course, understood that this engagement would only be brought about when the device is in position upon the back of an animal, the legs 40 of the animal engaged by the bar 31 of the yoke forcing the bar downwardly and thus raising the teeth 36 against the head 37 of the spring member.

As will be apparent from a study of the drawing, when the device is to be applied, the parts 15 and 18 of the snout engaging member are separated and the yoke 28 is carried in a vertical position by the frame, so that the frame may be dropped over the back of an animal to seat the yokes 4 across the animal's back, and when in this position, the lever 33 is quickly forced backward and downward thus bringing the bar 31 upward beneath the animal's hams 40, the spring 38 engaging the teeth 36 to prevent the return of the lever 33 upon its release. The lever 17 is then grasped and actuated to bring the member 18 inwardly toward the member 15 to grasp the snout of the hog, whereupon the ring 19 will fall downwardly preventing the reopening of the members. The hook member 25 is then engaged with the eye 20 upon the movable member 18 to permanently secure the two parts in locked position. If it is further desired to engage the animal's legs, the swinging bar 21 which swings upon the bolt 5 is then swung forward until the hook 22 engages the adjacent leg of the animal. It will be seen that the animal after these operations, would be entirely helpless and may be handled with ease and without danger to the handler.

What I claim is:—

1. In a hog catching and holding device, a frame comprising a series of spaced aligned yoke members adapted to straddle an animal's back, longitudinally extending bars connecting said yokes, certain of said bars extending beyond one end yoke of the series, means depending from the end of one of said extended bars for engaging the snout of an animal, and means carried by the yoke at that end of the series remote from said snout engaging means, for securing the rear legs of the animal.

2. In a hog catching and holding device, a frame comprising a series of spaced aligned yoke members adapted to straddle an animal's back, longitudinally extending bars connecting said yokes, certain of said bars extending beyond one end yoke of the series, means pivotally secured to and depending from the end of one of said extended bars for engaging the snout of an animal, and means carried by the yoke at that end of the series remote from said snout engaging means, for securing the rear legs of the animal.

3. In a hog catching and holding device, a frame comprising a series of spaced aligned yoke members adapted to straddle an animal's back, longitudinally extending bars connecting said yokes, certain of said bars extending beyond one end yoke of the series, means depending from the end of one of said extended bars for engaging the snout of an animal, and means carried by the yoke at that end of the series remote from said snout engaging means, for securing the rear legs of the animal, and a resilient rearwardly extending member carried by said frame for engaging and holding said leg securing means in engaged position.

4. In a hog catching and holding device, a frame adapted to saddle upon an animal's body, pivoted means supported upon the forward end of said frame for engaging the animal's snout, and pivoted means at the rear of said frame for engaging and securing the animal's rear legs.

5. In a hog catching and holding device, a frame adapted to saddle upon an animal's body, pivoted means at the forward end of and carried by said frame for engaging the animal's snout, pivoted means at the rear of the frame for engaging and holding the animal's rear legs, and a rigid hook carrying pivoted means depending from the forward end of the frame upon one side thereof for engaging and securing one of the animal's fore legs.

6. In a hog catching and holding device, a frame adapted to saddle and be supported upon an animal's body, a two part member carried upon and at the forward end of said frame for engaging the animal's snout, and means at the rear of said frame for securely holding both the animal's rear legs in a forwardly extending position beneath its body.

7. In a hog catching and holding device, a frame adapted to saddle and be carried upon an animal's body, a two part member supported upon and at the forward end of said frame for engaging the animal's snout, a hook member carried by the frame for securing said two part member in engaged position, and means swinging longitudinally of and at the rear of said frame for simultaneously engaging and securing both of the animal's rear legs.

8. In a hog catching and holding device, a frame adapted to saddle upon an animal's body, a two part member at the forward end of said frame for engaging the animal's snout, a hook member carried by the frame for securing said two part member in engaged position, pivoted means at the rear of said frame for engaging and securing the animal's rear legs, and spring catch means for adjustably securing said pivoted means in position.

9. In a hog catching and holding device, a frame adapted to saddle upon an animal's body, a pivoted snout grasping means at the forward end of the frame, a yoke shaped member straddling the rear of said frame and having its legs pivotally secured to said frame at a point inwardly of the ends thereof, and a bar connecting the ends of said legs beneath the frame for engaging and securing the animal's legs upon actuation of the member.

10. In a hog catching and holding device, a frame adapted to saddle upon an animal's body, a yoke shaped member straddling the rear of said frame and having its legs pivotally secured to said frame at a point inwardly of the ends thereof, a bar connecting the ends of said legs beneath the frame for engaging and securing the animal's legs upon actuation of the member, an actuating lever extending from the top of said yoke, teeth upon the upper edge of said lever, and a spring tongue having one end in engagement with said teeth and the other end secured to said frame, for retaining the yoke in adjusted position.

11. In a hog catching and holding device, a frame adapted to saddle upon an animal's body, a two part snout engaging member at the forward end of said frame, having one part immovably secured thereto, and having the other part pivotally secured thereto, an actuating lever extending from said pivoted part, an eye carried by said pivoted part, a hook member carried upon the frame for securing the pivoted part when in closed engagement with said immovably secured part, a yoke shaped member straddling the rear of said frame and having its legs pivotally secured to said frame at a point inwardly of the ends thereof, and a bar connecting the ends of said legs to the frame for engaging and securing the animal's legs upon actuation of the yoke-shaped member.

In testimony whereof, I affix my signature hereto.

HENRY TUFF.